(12) United States Patent
Lee (10) Patent No.: US 12,166,846 B2
(45) Date of Patent: Dec. 10, 2024

(54) CONTROL PLANE NETWORK FUNCTION DEVICE, USER PLANE NETWORK FUNCTION DEVICE, AND PACKET PROCESSING METHOD USING SAME

(71) Applicant: SK TELECOM CO., LTD., Seoul (KR)

(72) Inventor: Dong Jin Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 17/286,157

(22) PCT Filed: Oct. 17, 2019

(86) PCT No.: PCT/KR2019/013675
§ 371 (c)(1),
(2) Date: Apr. 16, 2021

(87) PCT Pub. No.: WO2020/080855
PCT Pub. Date: Apr. 23, 2020

(65) Prior Publication Data
US 2021/0392206 A1 Dec. 16, 2021

(30) Foreign Application Priority Data
Oct. 18, 2018 (KR) .................. 10-2018-0124490

(51) Int. Cl.
*H04L 69/08* (2022.01)
*H04L 69/22* (2022.01)

(52) U.S. Cl.
CPC ............. *H04L 69/08* (2013.01); *H04L 69/22* (2013.01)

(58) Field of Classification Search
CPC ..................................... H04L 43/04
See application file for complete search history.

(56) References Cited

U.S. PATENT DOCUMENTS

2009/0161547 A1* 6/2009 Riddle ................. H04L 69/161
370/236
2016/0099857 A1* 4/2016 Begwani ................ H04L 43/08
370/252

(Continued)

FOREIGN PATENT DOCUMENTS

KR 10-2018-0098144 A 9/2018
KR 10-2018-0106509 A 10/2018

(Continued)

OTHER PUBLICATIONS

International Search Report dated Jan. 22, 2020, in connection with corresponding International Patent Application No. PCT/KR2019/013675.

*Primary Examiner* — Oleg Survillo
*Assistant Examiner* — Christopher P Cadorna
(74) *Attorney, Agent, or Firm* — Hauptman Ham, LLP (57) ABSTRACT

In accordance with an aspect of the present disclosure, there is provided a control plane network function. The control plane network function comprises, a communication unit configured to receive a user plane packet (UPP); a packet analysis unit configured to analyze the received UPP to determine whether to process the received UPP; and a user plane processor configured to process the received UPP if the received UPP is determined to be processed, and to control the received UPP to be transmitted to a user plane network function (UP NF) if the received UPP is determined not to be processed.

14 Claims, 7 Drawing Sheets

(56) References Cited

U.S. PATENT DOCUMENTS

| | | | | |
|---|---|---|---|---|
| 2017/0244617 A1* | 8/2017 | Begwani | ................ | H04L 43/04 |
| 2018/0042040 A1* | 2/2018 | Chen | ................ | H04W 72/1263 |
| 2020/0314944 A1* | 10/2020 | Liu | ................ | H04W 76/25 |
| 2021/0058748 A1* | 2/2021 | Liao | ................ | H04W 76/11 |

FOREIGN PATENT DOCUMENTS

| | | |
|---|---|---|
| KR | 10-2018-0106998 A | 10/2018 |
| KR | 10-2018-0107000 A | 10/2018 |

* cited by examiner

CONTROL PLANE NETWORK FUNCTION DEVICE, USER PLANE NETWORK FUNCTION DEVICE, AND PACKET PROCESSING METHOD USING SAME

CROSS-REFERENCE TO RELATED APPLICATION

The present application is a national stage filing under 35 U.S.C § 371 of PCT application number PCT/KR2019/013675 filed on Oct. 17, 2019 which is based upon and claims the benefit of priorities to Korean Patent Application No. 10-2018-0124490, filed on Oct. 18, 2018 in the Korean Intellectual Property Office, which are incorporated herein in their entireties by reference.

TECHNICAL FIELD

The present disclosure relates to a control plane network function, a user plane network function, and a packet processing method using the control plane network function and the user plane network function.

BACKGROUND

As a type of a communication service and required data rate, etc. are diversified in the LTE communication system, expansion of the LTE frequency and evolution to the 5G communication system are actively progressing.

The rapidly evolving 5G communication system not only accommodates as many user equipments as possible based on limited radio resources but also supports scenarios of enhanced mobile broadband (eMBB), massive machine type communications (mMTC), and ultra-reliable and low latency communications (URLLC).

In the 5G communication system, the network structure to support, from end to end, the user equipments, base stations (radio access networks), cores, and servers is defined. Further, the control signaling functions and data transmission/reception functions that is performed in combination by a single node (e.g., S-GW, P-GW, etc.) in the existing LTE (4G) communication system are separated in the 5G communication system. Accordingly, a network structure that separates the Control Plane for the control signaling functions and the User Plane for the data transmission/reception functions is defined.

In this case, various nodes are included in the Control Plane. For example, the Access and Mobility Management Function (AMF) that controls wireless access of the user equipment, the Policy Control Function (PCF) that manages/controls policies such as user equipment information and subscription service information for each user equipment, billing, and the like, the Session Management Function (SMF) that manages/controls a session for using data services for each user equipment, and the Network Exposure Function (NEF) that performs an information sharing function with an external network may be included in the Control Plane.

In addition, functions such as the User Plane Function (UPF) may be included in the User Plane.

SUMMARY

Referring to Release 16 and 17 standardized for the 5G system, a role played by a control plane network function (CP NF) is distinguished from a role played by a user plane network function (UP NF).

For example, a session management function (SMF) belonging to the CP NF controls a customer's session, IP address, or billing related matters, etc. In addition, the SMF transmits a performance rule to a user plane function (UPF) belonging to the UP NF.

Alternatively, the UPF belonging to the UP NF receives the performance rule from the SMF described above, and transmits and receives traffic related to the customer's session according to the received performance rule.

Herein, in order to smoothly perform interworking, risk management, or seamless handover between networks, a part of roles predefined in the standard as being performed by the above-described CP NF may be performed by the UP NF. Similarly, a part of roles predefined in the standard as being performed by the UP NF may be performed by the CP NF.

In accordance with an aspect of the present disclosure, there is provided a control plane network function. The control plane network function comprises, a communication unit configured to receive a user plane packet (UPP); a packet analysis unit configured to analyze the received UPP to determine whether to process the received UPP; and a user plane processor configured to process the received UPP if the received UPP is determined to be processed, and to control the received UPP to be transmitted to a user plane network function (UP NF) if the received UPP is determined not to be processed.

In accordance with another aspect of the present disclosure, there is provided a user plane network function. The user plane network function comprises, a communication unit configured to receive a control plane packet (CPP); a packet analysis unit configured to analyze the received CPP to determine whether to process the received CPP; and a control plane processor configured to process the received CPP if the received CPP is determined to be processed, and to control the received CPP to be transmitted to a control plane network function (CP NF) if the received CPP is determined not to be processed.

In accordance with still another aspect of the present disclosure, there is provided a packet processing method performed by a control plane network function. The method comprises, receiving a user plane packet (UPP); analyzing the received UPP to determine whether to process the received UPP; and processing the received UPP if the received UPP is determined to be processed, and controlling the received UPP to be transmitted to a user plane network function if the received UPP is determined not to be processed.

In accordance with still another aspect of the present disclosure, there is provided a packet processing method performed by a user plane network function. The method comprises, receiving a control plane packet (CPP); analyzing the received CPP to determine whether to process the received CPP; and processing the received CPP if the received CPP is determined to be processed, and controlling the received CPP to be transmitted to a control plane network function if the received CPP is determined not to be processed.

Accordingly, the problem to be solved by the present disclosure provides a technology related to the UP NF capable of performing a part of the roles that the CP NF performs, and the CP NF capable of performing a part of the roles that the UP NF performs. For example, a technology for the UP NF capable of processing a control plane packet (CPP) or the CP NF capable of processing a user plane packet (UPP) is provided.

However, the problem to be solved by the present disclosure is not limited to the above description, and another problem to be solved that is not mentioned may be clearly understood by those skilled in the art to which the present disclosure belongs from the following description.

According to an embodiment, the CP NF may receive and process the UPP, and the UP NF may receive and process the CPP. Accordingly, in the 5G system, the interworking between networks, risk management, seamless handover, or interworking between heterogeneous networks may be smoothly performed.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
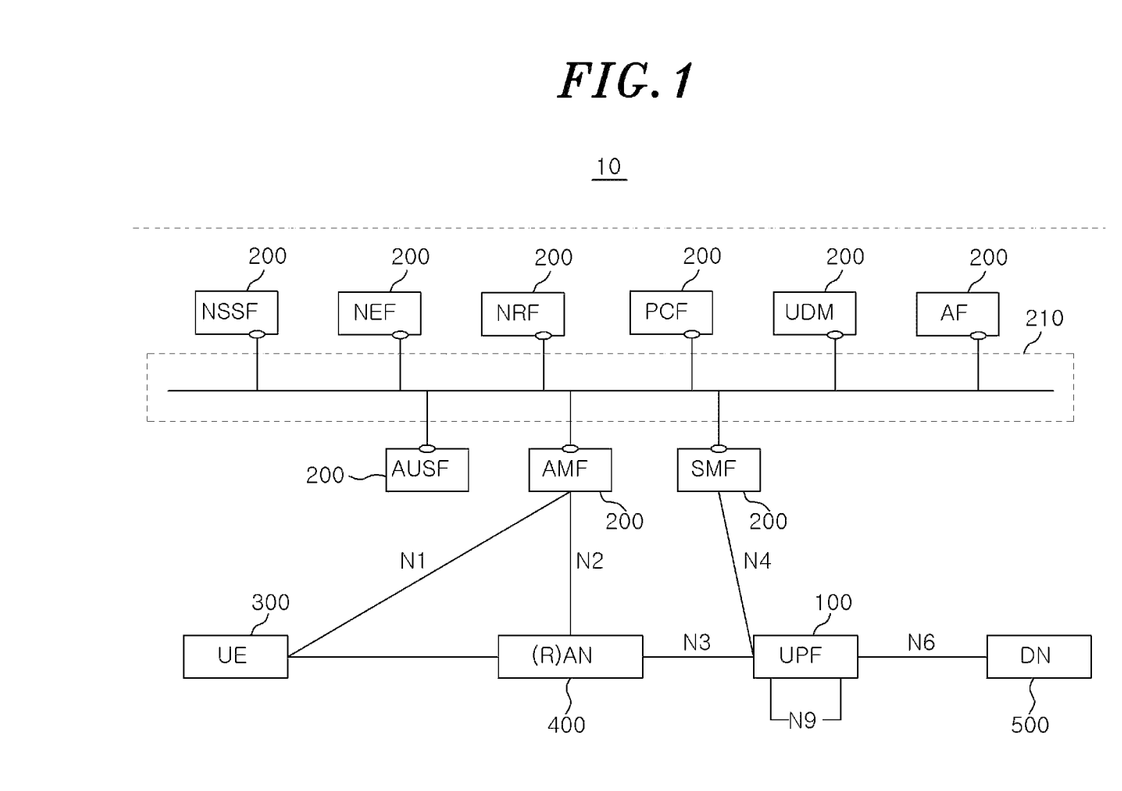
FIG. 1 shows a diagram illustrating an architecture of the 5G system according to an embodiment.

FIG. 1 shows a diagram illustrating an architecture 10 of the 5G system according to an embodiment.

The 5G system represented by the architecture 10 of FIG. 1 will be described. The 5G system is a technology evolved from a 4th generation LTE mobile communication technology. The 5G system is a new Radio Access Technology (RAT) and an expanded technology of the Long Term Evolution (LTE) through an evolution of an existing mobile communication network structure or a clean-state structure, and supports extended LTE (eLTE), non-3GPP access, and the like.

However, because the architecture 10 illustrated in FIG. 1 is just an example, the idea of the present disclosure is not interpreted as being limited to the architecture 10 illustrated in FIG. 1 nor the 5G communication system.

The architecture 10 includes various components (for example, a network function (NF)). Hereinafter, these components will be described.

Referring to FIG. 1, an Authentication Server Function (AUSF) 200, an (Core) Access and Mobility Management Function (AMF) 200, a Session Management Function (SMF) 200, a Policy Control Function (PCF) 200, an Application Function (AF) 200, Unified Data Management (UDM) 200, a Data Network (DN) 500, a User Plane Function (UPF) 100, an (Radio) Access Network ((R)AN) 400 or a base station 400, and a User Equipment (UE) 300, etc. are shown.

Among these components, the UPF 100 is a component included in a User Plane in the 5G system, and is classified as a User Plane Network Function (UP NF).

In addition, each of the SMF 200, the AMF 200, the AUSF 200, a NSSF 200, a NEF 200, the NRF 200, the UDM 200, and the AF 200 is a component included in a Control Plane separated from the User Plane, and may be referred to as a Control Plane Network Function (CP NF) 200.

The components included in the CP NF 200 are connected to each other by a service-based interface (SBI) 210. In addition, the SMF 200 and the UPF 100 are connected by an N4 interface, the AMF 200 and the UE 300 are connected by an N1 interface, and the AMF 200 and the (R)AN 400 are connected by an N2 interface, and the (R)AN 400 and the UPF 100 are connected by an N3 interface. Herein, through the N4 interface, a rule used by the CP NF 200 to control the UP NF 100 or a user plane packet may be transmitted. In addition, in FIG. 1, the N4 interface and the SBI 210 are shown to be separate interfaces. However, contrary to the illustration of FIG. 1, the N4 interface may be included in the SBI 210 according to an embodiment. In this case, the N4 interface is referred to as an N4/SBI rule used for transmission of the above-described rule or as an N4 UP/SBI UP through which the UPP is transmitted.

Figure 2:
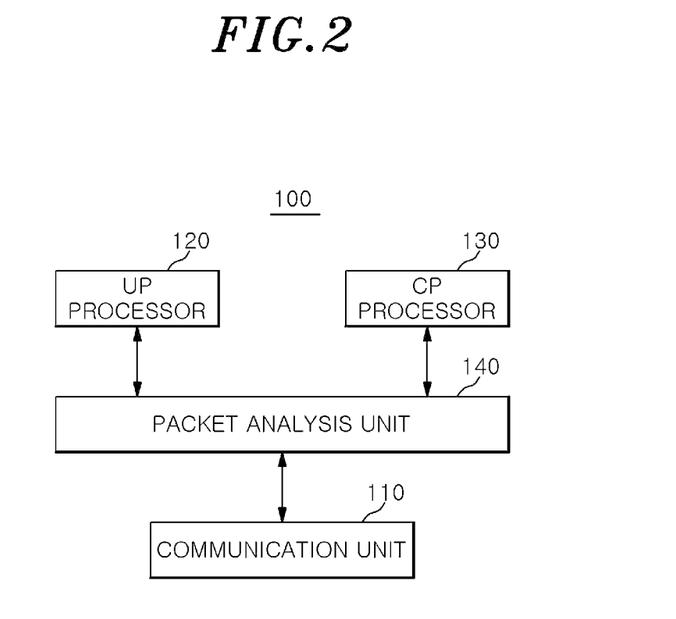
FIG. 2 shows a diagram illustrating a configuration of a UP NF according to an embodiment.

FIG. 2 shows a diagram illustrating a configuration of the UP NF 100 among the components shown in FIG. 1. Referring to FIG. 2, the UP NF 100 includes a communication unit 110, an UP processor 120, a CP processor 130, and a packet analysis unit 140. However, since what is illustrated in FIG. 2 is just an example, the configuration of the UP NF 100 is not limited to that illustrated in FIG. 2.

First, the UP NF 100 may be implemented by network function virtualization (NFV). Since the NFV technology itself is a publicly known technology, a detailed description thereof will be skipped.

The communication unit 110 is configured to transmit and receive a packet. Through the communication unit 110, a control plane packet (CPP) or a user plane packet (UPP) may be transmitted and received. Each of the CPP and the UPP is a packet related to any one of Layer 2 through Layer 7 including data or a message in the 5G communication system.

The UP processor 120 performs a default function that is defined as being processed by the UP NF 100, that is, defined to be performed by the UP NF 100 under the Release 16 and 17 standardized for the 5G communication system. In addition, the UP processor 120 may convert the CPP into the UPP.

The CP processor 130 performs 'some functions' described below among default functions that are defined as being processed by the CP NF 200, that is, defined to be performed by the CP NF 200 under the Release 16 and 17 standardized for the 5G communication system, but the some functions are not limited to the followings.

(1) The CP processor 130 may control the CPP received through the communication unit 110 to be transmitted again through the communication unit 110.

(2) The CP processor 130 may identify a message type of the CPP received through the communication unit 110 based on, for example, at least one of a service name, a service operation, and an attribute name, and may perform Qos Enforcement or Forwarding action according to the message.

(3) The CP processor 130 may convert the CPP. The conversion may be performed through, for example, header encapsulation or header decapsulation, changing a protocol type of a header or changing a field of the header, etc.

The packet analysis unit 140 analyzes a packet received through the communication unit 110, that is, the packet of Layer 2 through Layer 7 including the data or the message in the 5G communication system.

Examining the analysis process in more detail, the packet analysis unit 140 analyzes the received packet to determine whether the received packet is the CPP or the UPP. If the received packet is the UPP, the corresponding packet may be processed by the UP processor 120.

However, if the received packet is the CPP, the packet analysis unit 140 may further perform the following analysis.

First, the packet analysis unit 140 analyzes the CPP to determine whether the corresponding CPP may be processed by the CP processor 130 or whether the above-described conversion may be performed for the corresponding CPP. If it is determined that the corresponding CPP may be processed by the CP processor 130, the CP processor 130 processes the corresponding CPP. If it is determined that the conversion may be performed, the conversion process for the corresponding CPP may be performed together.

Alternatively, it may be determined that the corresponding CPP may not be processed by the CP processor 130. In this case, the CP processor 130 controls the corresponding CPP to be transmitted to another UP NF so that the corresponding CPP may be processed by the another UP NF. Similarly, if it is determined that the conversion may be performed as a result of the analysis, the conversion process for the corresponding CPP may be performed together.

Herein, the packet analysis unit 140 may comprehensively consider various items while analyzing, and then determine whether the corresponding CPP may be processed by the CP processor 130 and whether the conversion for the corresponding CPP may be performed. The various items may include the following, but are not limited thereto.

a type, a name, and an address of an interface used for transmission and reception of the corresponding CPP
matters (e.g., NF ID, IP, port) on a source and a destination used for transmission and reception of the corresponding CPP
the message type of the corresponding CPP (herein, the message type includes the service name, the service operation, or the attribute name, etc.)

Further, the packet analysis unit 140 may determine whether the corresponding CPP may be processed by the CP processor 130 based on a state of the CP processor 130. Herein, the state of the CP processor 130 may indicate a load of the CP processor 130 (e.g., usage of a CPU or a memory), a processing delay (e.g., a message processing delay), or a condition of the interface (e.g., a traffic bandwidth or latency), but is not limited thereto.

In the following [Table 1], the various items that the packet analysis unit 140 may consider during the above-described analysis are presented as examples. However, since [Table 1] is just an example, the various items that may be considered for the analysis are not limited to those shown in [Table 1].

TABLE 1

| Control Plane Interface Type | Interface Name | Interface Address | Source-Destination Address | Message Type1 (e.g., Service Name, Elementary Procedure) | Message Type1 (e.g., Service Operation) | Message TypeN (e.g., Attribute Name) | PROCESSING METHOD (e.g., MASSAGE PROCESSING Yes/No) | TRANSMISSION Interface |
|---|---|---|---|---|---|---|---|---|
| N1, N2 | "NAS_03" | IP/Port | NF ID/IP/Port | PDU session resource . . . | Setup . . . | . . . | MASSAGE PROCESSING No QoS Enforcement Forward Action | CONVERSION No (N1, N2) |
| SBI | "Nsmf_01" | IP/Port | NF ID/IP/Port | Nsmf PDUSession . . . | Update . . . | . . . | MASSAGE PROCESSING No Forward Action | CONVERSION No (SBI) |
| SBI | "Npcf_04" | IP/Port | NF ID/IP/Port | Npcf SMPolicyControl . . . | (Create, Update) . . . | . . . | MASSAGE PROCESSING No Forward Action (Drop) | CONVERSION No (SBI) |
| SBI | "Nchf_50" | IP/Port | NF ID/IP/Port | Nchf ConvergedCharging . . . | (Create, Update) . . . | . . . | MASSAGE PROCESSING Yes | CONVERSION No (SBI) |
| N4 | "N4_PFCP Rule" | IP/Port | NF ID/IP/Port | Session Establishment . . . | Request . . . | . . . | MASSAGE PROCESSING Yes | CONVERSION No (N4) |
| . . . | . . . | . . . | . . . | . . . | . . . | . . . | . . . | . . . |

Hereinafter, a procedure of processing a packet by the UP NF 100 will be described. If the packet received through the communication unit 110 is the UPP, the packet analysis unit 140 determines that the corresponding packet may be processed by the UP processor 120, and accordingly, the UP processor 120 processes the corresponding packet. However, if the corresponding packet is the CPP, the packet analysis unit 140 performs analysis of the corresponding packet by considering the various items described above. Whether the corresponding CPP may be processed by the CP processor 130 and whether the conversion of the corresponding CPP may be performed may be derived as the result of the analysis, and a corresponding operation is performed according to the derived result.

Figure 3:
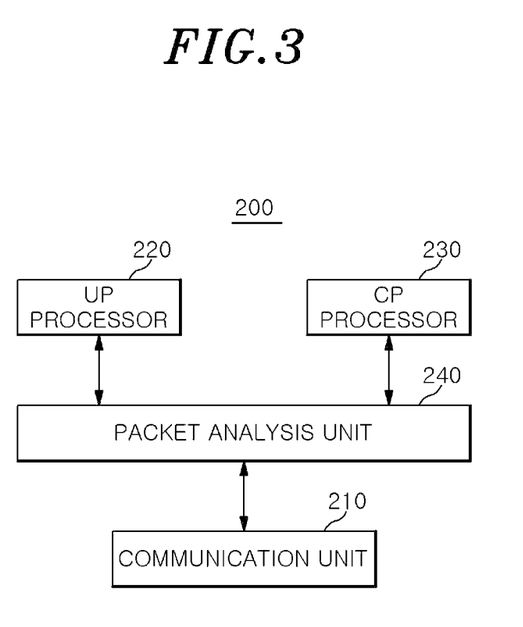
FIG. 3 shows a diagram illustrating a configuration of a CP NF according to an embodiment.

FIG. 3 shows a diagram illustrating a configuration of the CP NF 200 among the components shown in FIG. 1. Referring to FIG. 3, the CP NF 200 includes a communication unit 210, a CP processor 220, a UP processor 230, and a packet analysis unit 240. However, since what is shown in FIG. 3 is just an example, the configuration of the CP NF 200 is not limited to that shown in FIG. 3.

First, similarly to the UP NF 100, the CP NF 200 may also be implemented by NFV.

The communication unit 210 is configured to transmit and receive a packet, and since the communication unit 210 corresponds to the communication unit 110 illustrated in FIG. 2, description of the communication unit 110 may be applied to the communication unit 210.

The CP processor 220 performs a default function that is defined as being processed by the CP NF 200, that is, defined to be performed by the CP NF 200 under the Release 16 and 17 standardized for the 5G communication system. In addition, the CP processor 220 may convert a UPP into a CPP.

The UP processor 230 performs 'some functions' described below among default functions that are defined as being processed by the UP NF 100, that is, defined to be performed by the UP NF 100 under the Release 16 and 17 standardized for the 5G communication system, but the some functions are not limited to the followings.

(1) The UP processor 230 may control the UPP received through the communication unit 210 to be transmitted again through the communication unit 210.

(2) The UP processor 230 may identify a session or a packet type used for the UPP received by the communication unit 210 through an N3 interface, an N6 interface, and an N9 interface, and accordingly, QOS Enforcement or Forwarding action may be performed.

(3) The UP processor 230 may convert the UPP. The conversion may be performed through, for example, header encapsulation or header decapsulation, changing a protocol type of a header or changing a field of the header, etc.

The packet analysis unit 240 analyzes a packet received through the communication unit 210, that is, the packet of Layer 2 through Layer 7 including data or a message in the 5G communication system. Examining the analysis process in more detail, the packet analysis unit 240 analyzes the received packet to determine whether the received packet is the CPP or the UPP. If the received packet is the CPP, the corresponding packet may be processed by the CP processor 220.

However, if the received packet is the UPP, the packet analysis unit 240 may further perform the following analysis.

First, the packet analysis unit 240 analyzes the UPP to determine whether the corresponding UPP may be processed by the UP processor 230 or whether the above-described conversion for the corresponding UPP may be performed. If it is determined that the UPP may be processed by the UP processor 230, the corresponding UPP is processed by the UP processor 230. If it is determined that the conversion may be performed, the conversion process for the corresponding UPP may be performed together.

Alternatively, it may be determined that the corresponding UPP may not be processed by the UP processor 230. In this case, the UP processor 230 controls the corresponding UPP to be transmitted to another CP NF so that the corresponding control plane packet may be processed by the another CP NF. Similarly, if it is determined that the conversion may be performed as the result of the analysis, the conversion process for the corresponding UPP may be performed together.

Herein, the packet analysis unit 240 may comprehensively consider various items while analyzing, and then determine whether the corresponding UPP may be processed by the UP processor 230 and whether the conversion for the corresponding CPP may be performed. The various items may include the following, but are not limited thereto.

- a type, a name, and an address of an interface used for transmission and reception of the corresponding UPP
- matters (NF ID, IP, port) on a source and a destination used for transmission and reception of the corresponding UPP
- the message type of the corresponding UPP (herein, the message type includes the service name, the service operation, or the attribute name, etc.)

Further, the packet analysis unit 240 may determine whether the corresponding UPP may be processed by the UP processor 230 based on a state of the UP processor 230. Herein, the state of the UP processor 230 may indicate a load of the UP processor 230 (e.g., usage of a CPU or a memory), a processing delay (e.g., a message processing delay), or a condition of the interface (e.g., a traffic bandwidth or latency), but is not limited thereto.

In the following [Table 2], the various items that the packet analysis unit 240 may consider during the above-described analysis are presented as examples. However, since [Table 2] is just an example, the various items that may be considered for the analysis are not limited to those shown in [Table 2].

TABLE 2

| User Plane Interface Type | Interface Name | Source-Interface Address | Destination Address | Message Type1 (e.g., Service Name, Elementary Procedure) | Message Type2 (e.g., Service Operation) | Message TypeN (e.g., Attribute Name) | PROCESSING METHOD (e.g., MASSAGE PROCESSING Yes/No) | TRANSMISSION Interface |
|---|---|---|---|---|---|---|---|---|
| N4 | "N4_PFCP Rule" | IP/Port | NF ID/IP/Port | Session Establishment ... | Response | ... | MASSAGE PROCESSING Yes | CONVERSION No (SBI) |
| SBI | "Nupf_01" | IP/Port | NF ID/IP/Port | Nupf Session ... | (Establishment, Modification) | ... | MASSAGE PROCESSING | CONVERSION No (SBI) |

TABLE 2-continued

| User Plane Interface Type | Interface Name | Interface Address | Source-Destination Address | Message Type1 (e.g., Service Name, Elementary Procedure) | Message Type2 (e.g., Service Operation) | Message TypeN (e.g., Attribute Name) | PROCESSING METHOD (e.g., MASSAGE PROCESSING Yes/No) | TRANSMISSION Interface |
|---|---|---|---|---|---|---|---|---|
| N4 | "N4_PFCP Rule" | IP/Port | NF ID/IP/Port | Session Report . . . | Request . . . | DDN | Yes MASSAGE PROCESSING Yes | CONVERSION Yes (SBI) |
| N6 | "Core-Internet_0" | IP/Port | NF ID/IP/Port | STP . . . | INVITE . . . | . . . | MASSAGE PROCESSING No Qos Enforcement Forward Action | CONVERSION Yes (SBI) |
| N9 | "Core Core_2" | IP/Port | NF ID/IP/Port | GTPU . . . | . . . | . . . | MASSAGE PROCESSING No Qos Enforcement Forward Action | CONVERSION No (N9) |
| . . . | . . . | . . . | . . . | . . . | . . . | . . . | . . . | . . . |

Hereinafter, a procedure of processing a packet in the CP NF 200 will be described. If the packet received through the communication unit 210 is the CPP, the packet analysis unit 240 analyzes that the corresponding packet may be processed by the CP processor 220, and accordingly, the CP processor 220 processes the corresponding packet. However, if the packet is the UPP, the packet analysis unit 240 performs analysis of the corresponding packet by considering the various items described above. As a result of the analysis, whether the corresponding UPP may be processed by the UP processor 230 and whether the conversion of the corresponding UPP may be performed may be derived.

As described above, the UP NF 100 may perform not only the default functions defined as being performed by the UP NF 100, but also 'a part' of the functions defined as being performed by the CP NF 200. This is the same as the CP NE 200. The CP NF 200 may perform not only the default functions defined as being performed by the CP NF 200, but also 'a part' of functions defined as being performed by the UP NF 100.

For example, when the UP NF 100 receives the CPP, the UP NF 100 may control the CPP to be transmitted to the CP NF 200. Alternatively, when receiving CPP, the UP NF 100 may convert the CPP into the UPP, and then may control the converted UPP to be transmitted to the UP NF 100.

This is the same as the CP NF 200. For example, when receiving the UPP, the CP NF 200 may control the UPP to be transmitted to the UP NF 100. In addition, when receiving the UPP, the CP NF 200 may convert the UPP into the CPP and then may control the converted CPP to be transmitted to the CP NE 200.

As described above, according to an embodiment, the CP NF 200 may receive and process the UPP, and the UP NE 100 may receive and process the CPP. In other words, functions may be partially linked between the CP NF 200 and the UP NF 100. Accordingly, in the 5G system, interworking between networks, risk management, seamless handover, or interworking between heterogeneous networks may be smoothly performed.

Hereinafter, the process in which the UP NF 100 receives and processes the CPP will be described first.

Figure 4:
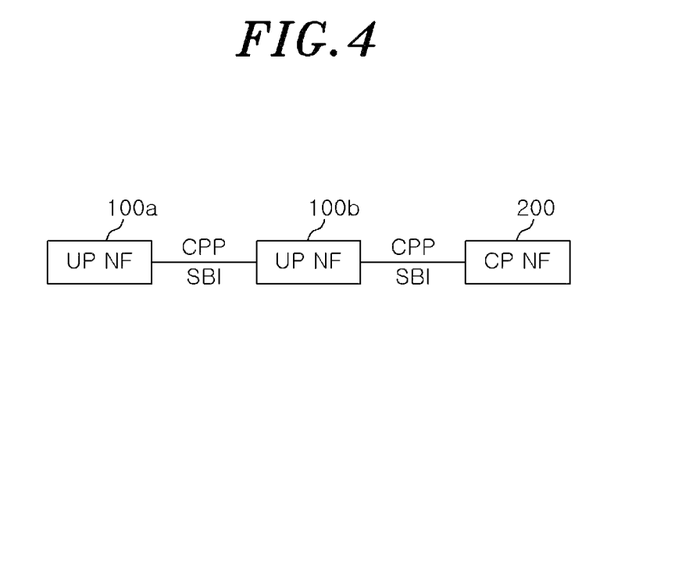
FIG. 4 shows a diagram illustrating a first example in which a CPP is processed by a UP NF according to an embodiment.
Figure 5:
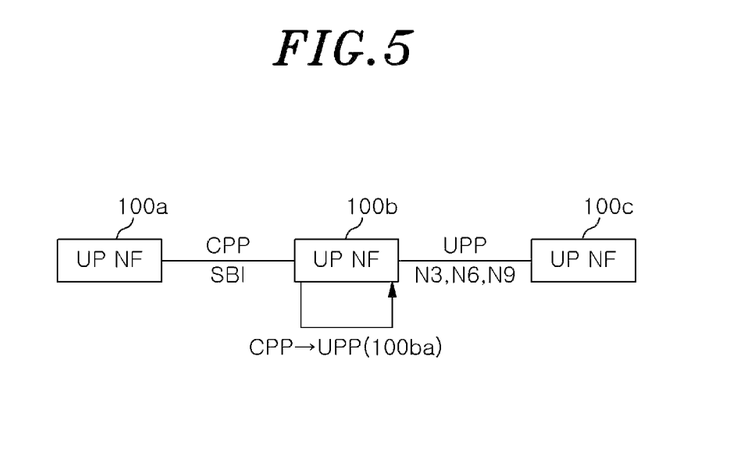
FIG. 5 shows a diagram illustrating a second example in which a CPP is processed by a UP NF according to an embodiment.

FIG. 4 shows a diagram illustrating a first example in which a CPP is processed by the UP NF 100 according to an embodiment, and FIG. 5 shows a diagram illustrating a second example in which the CPP is processed by the UP NF 100 according to an embodiment.

In FIG. 4, a UP NF 100*b* shown in the center will be described as a reference. In FIG. 4, the UP NF 100*b* receives the CPP from a UP NF 100*a*. The UP NF 100*b* analyzes the received CPP to determine whether the UP NF 100*b* may process the received CPP and whether the received CPP may be converted. FIG. 4 shows a case where it is determined that the UP NF 100*b* may not process the corresponding CPP and the received CPP may not be converted. The UP NF 100*b* directly transmits the CPP received from the UP NF 100*a* to the CP NF 200.

In other words, according to an embodiment, the UP NF 100*b* receiving the CPP may transmit the corresponding CPP to the CP NF 200 without processing. In addition, the UP NF 100*b* may identify a packet type based on at least one of, for example, a service name, a service operation, and an attribute name, and may perform QoS Enforcement and Forwarding action according to a message.

Thereafter, in FIG. 5, the UP NF 100*b* shown in the center will be described as a reference. In FIG. 5, the UP NF 100*b* receives the CPP from the UP NF 100*a*. The UP NF 100*b* analyzes the received CPP to determine whether the UP NF 100*b* may process the received CPP and whether the received CPP may be converted. FIG. 5 shows a case where it is determined that the UP NF 100*b* may process the corresponding CPP and the received CPP may be converted. The UP NF 100*b* converts the CPP received from the UP NF 100*a* into a UPP 100*ba* and processes the converted UPP 100*ba*, and then transmits the processed UPP 100*ba* to another UP NF 100*c*.

In other words, according to an embodiment, the UP NF 100*b* receiving the CPP may convert the corresponding CPP into the UPP 100*ba*, thereby transmitting to the another UP NF 100*c*.

Figure 6:
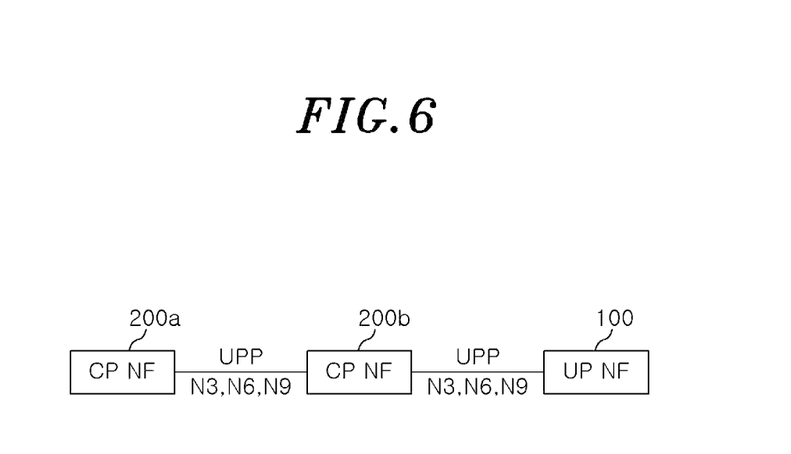
FIG. 6 shows a diagram illustrating a first example in which a UPP is processed by a CP NF according to an embodiment.
Figure 7:
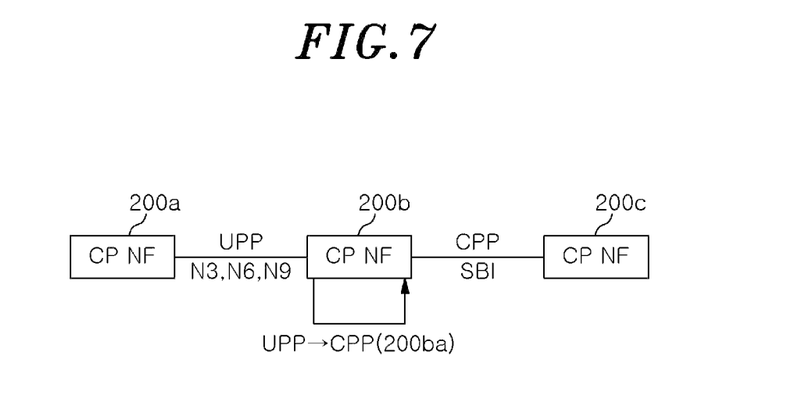
FIG. 7 shows a diagram illustrating a second example in which a CPP is processed by a UP NE according to an embodiment.

FIG. 6 shows a diagram illustrating a first example in which a UPP is processed by the CP NF 200 according to an embodiment, and FIG. 7 shows a diagram illustrating a second example in which the UPP is processed by the CP NF 200 according to an embodiment.

In FIG. 6, a CP NF 200*b* shown in the center will be described as a reference. In FIG. 6, the CP NF 200*b* receives the UPP from a CP NF 200*a*. The CP NF 200*b* analyzes the received UPP to determine whether the CP NF 200*b* may process the received UPP and whether the received UPP may be converted. FIG. 6 shows a case where it is determined that the CP NF 200*b* may not process the corresponding UPP and the received UPP may not be converted. The CP NF 200*b* directly transmits the UPP received from the CP NF 200*a* to the UP NF 100.

In other words, according to an embodiment, the CP NF 200*b* receiving the UPP may transmit the corresponding UPP to the UP NF 100 without processing. In addition, the CP NF 200*b* may identify a packet type based on at least one of, for example, a service name, a service operation, and an attribute name, and may perform QOS Enforcement and Forwarding action according to a message.

Thereafter, in FIG. 7, the CP NF 200*b* shown in the center will be described as a reference. In FIG. 7, the CP NF 200*b* receives the UPP from the CP NF 200*a*. The CP NF 200*b* analyzes the received UPP to determine whether the CP NF 200*b* may process the received UPP and whether the received UPP may be converted. FIG. 7 shows a case where it is determined that the CP NF 200*b* may process the corresponding UPP and the received UPP may be converted. The CP NF 200*b* converts the UPP received from the CP NF 200*a* into a CPP 200*ba* and processes the converted CPP 200*ba*, and then transmits the processed CPP 200*ba* to another CP NF 200*c*.

In other words, according to an embodiment, the CP NF 200*b* receiving the UPP may convert the corresponding UPP into the CPP 200*ba*, thereby transmitting to the another CP NF 200*c*.

Figure 8:
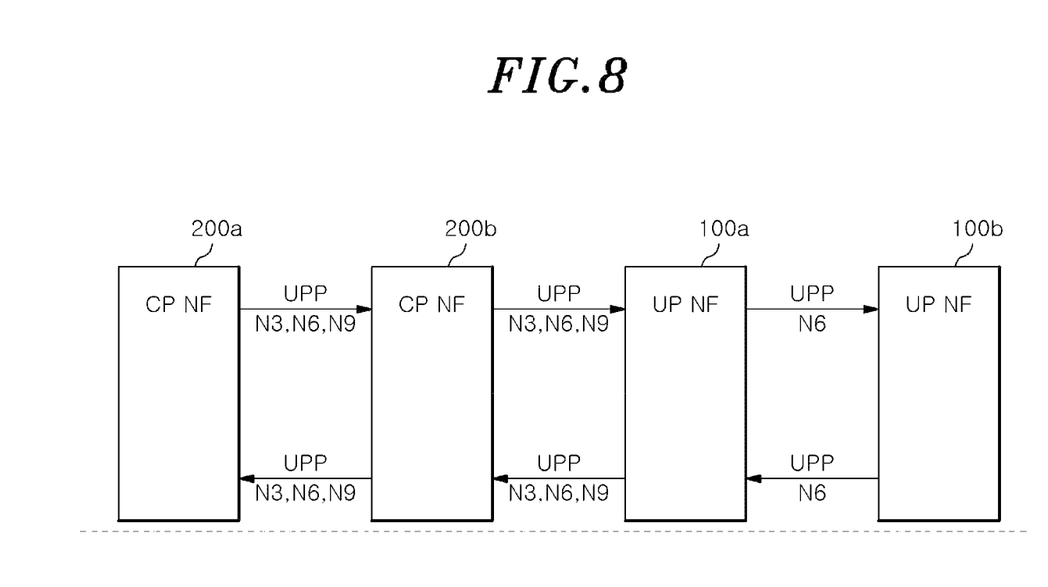
FIG. 8 shows a diagram illustrating a third example in which a UPP is processed by a CP NF according to an embodiment.

FIG. 8 shows a diagram illustrating a third example in which a UPP is processed by the CP NF 200 according to an embodiment.

Referring to FIG. 8, the CP NF 200*a* transmits a UPP to the CP NF 200*b* through one of the N3, N6, and N9 interfaces. Then, the CP NF 200*b* analyzes a received packet whether the packet received from the CP NF 200*a* is a CPP or a UPP. If the packet is the UPP, the CP NF 200*b* analyzes the UPP to determine whether the CP NE 200*b* may process the UPP or whether the UPP may be converted. FIG. 8 assumes that it is determined that the CP NF 200*b* may not process the UPP and the UPP may not be converted.

Accordingly, the CP NF 200*b* performs at least one of Qos Enforcement and Forwarding action for the corresponding UPP, and the CP NF 200*b* transmits the UPP through any one of the N3, N6 and N9 interfaces to the UP NF 100*a*. Thereafter, the UP NF 100*a* processes the corresponding UPP and transmits a result of the processing to the UP NF 100*b* through the N6 interface.

Then, the UPP is transmitted from the UP NF 100*b* to the CP NF 200*a* through the UP NF 100*a* and then through the CP NF 200*b*.

Figure 9:
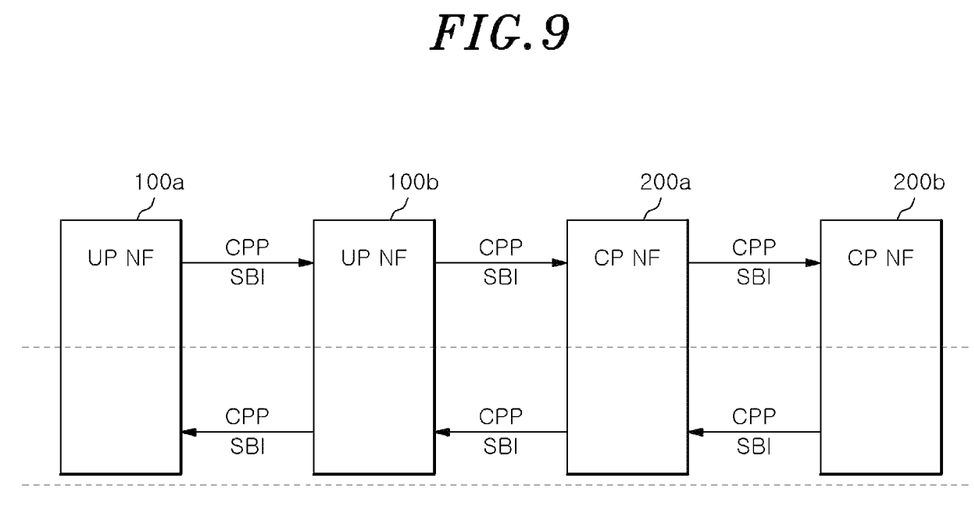
FIG. 9 shows a diagram illustrating a fourth example in which a CPP is processed by a UP NF according to an embodiment.

FIG. 9 shows a diagram illustrating a fourth example in which a CPP is processed by the UP NF according to an embodiment.

Referring to FIG. 9, the UP NF 100*a* transmits a CPP to the UP NF 100*b* through an SBI 210.

Then, the UP NF 100*b* analyzes the received packet whether the packet received from the UP NF 100*a* is a CPP or a UPP. If the packet is the CPP, the UP NF 100*b* analyzes the CPP to determine whether the UP NF 100*b* may process the CPP or whether the CPP may be converted. FIG. 9 assumes that it is determined that the UP NF 100*b* may not process the CPP and the CPP may not be converted.

Accordingly, the UP NF 100*b* performs at least one of Qos Enforcement and Forwarding action for the corresponding CPP. In addition, the UP NF 100*b* transmits the CPP through the SBI 210 to the CP NF 200*a*. Thereafter, the CP NF 200*a* processes the corresponding CPP and transmits a result of the processing to the CP NF 200*b* through the SBI 210.

Then, the CPP is transmitted from the CP NF 200*b* to the UP NF 100*a* through the CP NF 200*a* and then through the UP NF 100*b*.

As described above, according to an embodiment, CP NF 200 may receive and process the UPP, and UP NF 100 may receive and process the CPP. In other words, functions may be partially linked between the CP NF 200 and the UP NF 100. Accordingly, in the 5G system, interworking between networks, risk management, seamless handover, or interworking between heterogeneous networks may be smoothly performed.

On the other hand, the above-described embodiments of the present disclosure may be implemented in form of a computer-readable storage medium storing a computer program programmed to perform each step included in the method or the computer program, stored in the computer-readable storage medium, programmed to perform each step included in the method.

According to an embodiment, interworking between networks, risk management, seamless handover, or interworking between heterogeneous networks may be smoothly performed in the 5G system.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. A packet processing method performed by a control plane network function device, the method comprising:
    processing a received packet to determine whether the packet comprises a control plane packet (CPP) or a user plane packet (UPP);
    in response to determining the packet comprises the CPP, causing a control plane processor included among one or more processors of the control plane network function device to process the CPP; and
    in response to determining the packet comprises the UPP:
        determining a current state of a user plane processor included in the one or more processors, the current state of the user plane processor being based on one or more of a usage load of the user plane processor, a message processing delay, or an interface condition of the user plane processor;
        in response to the current state of the user plane processor being a first state, causing the user plane processor to process the UPP in accordance with one or more first predefined functions among a set of predefined functions for processing the UPP assigned to a user plane network function (UP NF) device communicatively coupled with the control plane network function device in a communication system comprising the control plane network function device and the UP NF device;
        in response to the current state of the user plane processor being a second state, causing the user plane processor to process the UPP in accordance with one or more second predefined functions among the set of predefined functions for processing the UPP assigned to the UP NF device; and in response to the current state of the user plane processor being a third state, causing the to control plane processor to convert the UPP into a converted CPP, and cause the converted CPP to be transmitted to another control plane network function device included in the communication system.

2. A control plane network function device comprising:
one or more processors; and
a memory having instructions stored thereon that, when executed by the one or more processors, cause the control plane network function device to:
process a received packet to determine whether the packet comprises a control plane packet (CPP) or a user plane packet (UPP);
in response to determining the packet comprises the CPP, cause a control plane processor included in the one or more processors to process the CPP; and
in response to determining the packet comprises the UPP:
determine a current state of a user plane processor included in the one or more processors, the current state of the user plane processor being based on one or more of a usage load of the user plane processor, a message processing delay, or an interface condition of the user plane processor;
in response to the current state of the user plane processor being a first state, cause the user plane processor to process the UPP in accordance with one or more first predefined functions among a set of predefined functions for processing the UPP assigned to a user plane network function (UP NF) device communicatively coupled with the control plane network function device in a communication system comprising the control plane network function device and the UP NF device;
in response to the current state of the user plane processor being a second state, cause the user plane processor to process the UPP in accordance with one or more second predefined functions among the set of predefined functions for processing the UPP assigned to the UP NF device; and
in response to the current state of the user plane processor being a third state, cause the control plane processor to convert the UPP into a converted CPP, and cause the converted CPP to be transmitted to another control plane network function device included in the communication system.

3. The control plane network function device of claim 2, wherein the converted CPP is transmitted through a service-based interface (SBI) to the other control plane network function device.

4. The control plane network function device of claim 2, wherein the control plane processor is caused to convert the UPP into the converted CPP through changing a protocol type, changing a field of the header, header encapsulation or header decapsulation.

5. The control plane network function device of claim 2, wherein the interface condition corresponds to the packet being received through an N3 interface, an N6 interface, or an N9 interface.

6. The control plane network function device of claim 2, wherein the control plane network function device is further caused to:
in response to the current state of the user plane processor being a fourth state, cause the UPP to be transmitted to the UP NF device through an N3 interface, an N6 interface, or an N9 interface.

7. The control plane network function device of claim 2, wherein the control plane network function device is further caused to:
in response to determining the packet comprises the UPP, determine at least one of an interface used to receive the packet or a message type of the UPP.

8. The control plane network function device of claim 7, wherein the message type includes at least one of a service name, a service operation, or an attribute name for the UPP.

9. A user plane network function device, comprising:
one or more processors; and
a memory having instructions stored thereon that, when executed by the one or more processors, cause the user plane network function device to:
process a received packet to determine whether the packet comprises a control plane packet (CPP) or a user plane packet (UPP);
in response to determining the packet comprises the UPP, cause a user plane processor included in the one or more processors to process the UPP; and
in response to determining the packet comprises the CPP:
determine a current state of a control plane processor included in the one or more processors, the current state of the control plane processor being based on one or more of a usage load of the control plane processor, a message processing delay, or an interface condition of the control plane processor;
in response to the current state of the control plane processor being a first state, cause the control plane processor to process the CPP in accordance with one or more first predefined functions among a set of predefined functions for processing the CPP assigned to a control plane network function (CP NF) device communicatively coupled with the user plane network function device in a communication system comprising the user plane network function device and the CP NF device;
in response to the current state of the control plane processor being a second state, cause the control plane processor to process the CPP in accordance with one or more second predefined functions among the set of predefined functions for processing the CPP assigned to the CP NF device; and
in response to the current state of control plane processor being a third state, cause the user plane processor to convert the CPP into a converted UPP, and cause the converted UPP to be transmitted to another user plane network function device included in the communication system.

10. The user plane network function device of claim 9, wherein the user plane processor is caused to convert the CPP into the converted UPP through changing a protocol type, changing a field of the header, header encapsulation or header decapsulation.

11. The user plane network function device of claim 9, wherein the packet is received through a service-based interface (SBI).

12. The user plane network function device of claim 9, wherein the user plane network function device is further caused to:
in response to the current state of the control plane processor being a fourth state, cause the CPP to be transmitted to the CP NF device through a service-based interface (SBI).

13. The user plane network function device of claim 9, wherein the user plane network function device is further caused to:
 in response to determining the packet comprises the CPP, determine at least one of an interface used to receive the packet or a message type of the CPP.

14. The user plane network function device of claim 13, wherein the message type includes at least one of a service name, a service operation, or an attribute name for the CPP.

* * * * *